United States Patent [19]

Oshiyama et al.

[11] Patent Number: 5,937,157
[45] Date of Patent: Aug. 10, 1999

[54] INFORMATION PROCESSING APPARATUS AND A CONTROL METHOD

[75] Inventors: Takashi Oshiyama, Fujisawa; Masahiko Shinomura, Machida, both of Japan

[73] Assignee: International Business Machines Corporation, Armonk, N.Y.

[21] Appl. No.: 08/636,209

[22] Filed: Apr. 22, 1996

[30] Foreign Application Priority Data

Jun. 22, 1995 [JP] Japan .................................. 7-155681

[51] Int. Cl.⁶ ............................................. H04K 1/00
[52] U.S. Cl. .............................................. 395/186
[58] Field of Search ...................... 395/186, 187.01, 395/188.01; 380/3, 4, 23, 25

[56] References Cited

U.S. PATENT DOCUMENTS

| | | | |
|---|---|---|---|
| 5,012,514 | 4/1991 | Renton | 380/4 |
| 5,426,762 | 6/1995 | Nakagawa | 380/3 |
| 5,430,867 | 7/1995 | Gunji | 395/750 |
| 5,442,704 | 8/1995 | Holtey | 380/23 |
| 5,533,125 | 7/1996 | Bensimon et al. | 380/3 |
| 5,600,841 | 2/1997 | Culbert | 396/750 |

*Primary Examiner*—Albert DeCady
*Attorney, Agent, or Firm*—Ronald L. Drumheller

[57] ABSTRACT

According to the present invention, illegal invasion (i.e., access to secret data) from an installed PC card of an information processing apparatus can be appropriately prevented. When an operating mode enters a security mode, a personal computer performs a pseudo operation as though a device were not installed therein, regardless of whether the device is actually installed. During the security mode, therefore, power is not supplied to the installed device so that it does not become active. During this mode, the information processing apparatus can not exchange data with the installed device.

20 Claims, 7 Drawing Sheets

FIG. 7a
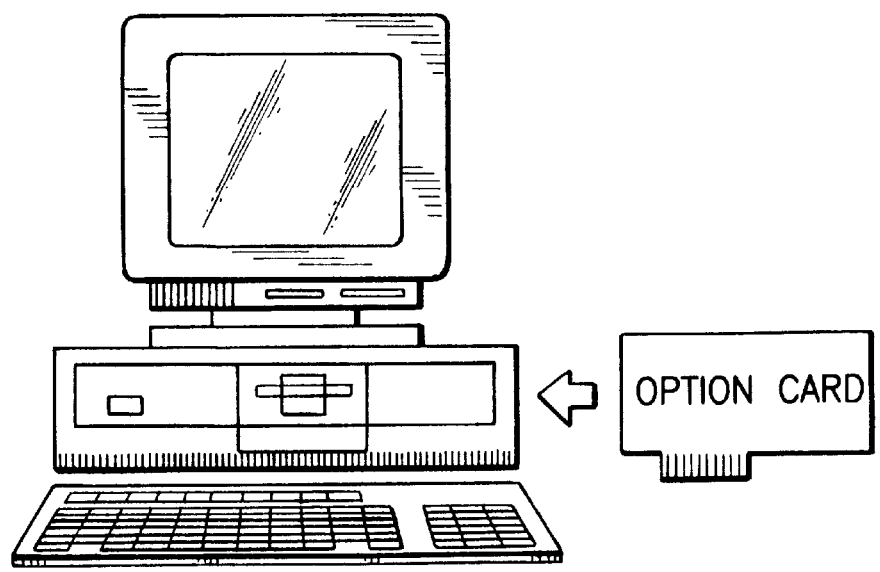
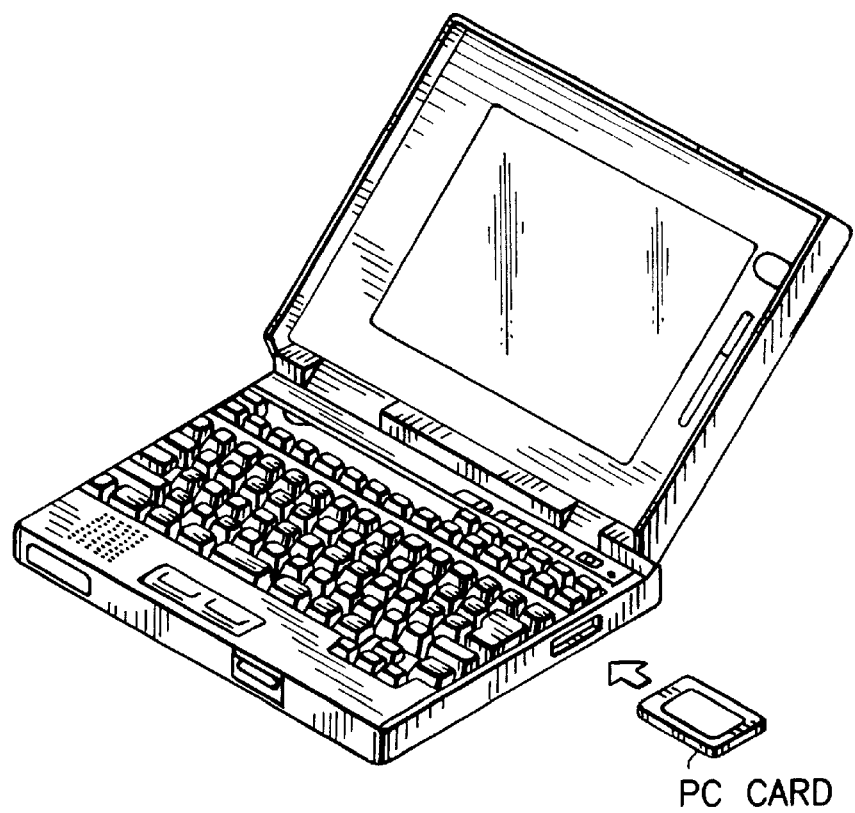
FIG. 7b

INFORMATION PROCESSING APPARATUS AND A CONTROL METHOD

TECHNICAL FIELD

The present invention relates to an information processing apparatus, such as a personal computer, in which an expansion device (e.g., a PC card) can be installed, and to a control method therefor; and in particular to an information processing apparatus that can protect secret information when an expansion device is installed, and to a control method therefor. More specifically, the present invention pertains to an information processing apparatus that can protect secret information by employing software when an expansion device is installed, and to a control method therefor.

DESCRIPTION OF THE PRIOR ART

As progress in the current technique continues, various types of personal computers, such as desktop types and notebook types, are being manufactured and sold.

Such personal computers (hereafter also referred to as "PCs") are designed compactly, and thus there is a limit to the number of peripheral devices (system memory, input/output devices, and auxiliary storage devices) that can be installed as standard features at the time of shipping. Therefore, after purchasing PCs, many users install necessary expansion devices themselves to increase the performance of their computers upon their own needs.

For PCs, such as desktop computers or tower computers, that have extra space inside the cabinet, the expansion of devices is performed by inserting a desired adaptor card (an "option card" or an "expansion board") into an expansion slot on a system board (see FIG. 7(a)). Specific adaptor card examples are video adapters, communication adapters, floppy disk interfaces, hard disk interfaces, serial interfaces, parallel interfaces, expanded memory, and SCSI interfaces (Small Computer System Interface).

For notebook computers, since the installed components are highly compacted and almost no extra space exists inside the case, the installation of an adaptor card is not practical. (While some desktop/tower PCs have ten or more expansion slots, laptop and notebook computers have no expansion slots, or one or two of small slots at most.)

A so-called PC card is an expansion device in the size of a credit card that has been developed to supplement the expansion of a notebook computer (see FIG. 7(b)). The hardware (i.e., mechanical and electrical) guidelines for a PC card are established as international standards mainly by the U.S. PCMCIA (Personal Computer Memory Card International Association) and JEIDA (Japan Electronic Industry Development Association). At present, there are three types of PC cards: Type I, which is 3.3 mm thick; Type II, which is 5.5 mm thick; and Type III, which is 10.5 mm thick. Type I is mainly used as a memory card. Type II is used for a facsimile modem, an Ethernet adaptor, and a SCSI adaptor. Type III is used mainly as a card incorporating a hard disk. These PC cards are derived from the technique for making compact electronic items, and fit demands for size and weight reduction, low power consumption, and notebook computer portability. The employment of PC cards has rapidly spread since PMCIA Re12.1/JEIDA 4.2 was adopted as an international standard in 1993. Currently, almost all notebook computers have PC cards slot as a standard feature. Further, an advantageous application of a PC card is not limited to notebook computers, but desktop PCs having PC card slots are also increasing (for example, IBM PC (personal computer) 720s and IBM PC 750s have PC card slots even though they are desktops). Since in the summer of 1994 the U.S. government stated, as a supply standard, that PC card slot must be provided for all desktop PCs, not only notebook PCs but also desktop PCs are becoming a large market for PC cards. Although the prices of the PC cards are higher than those of adaptor cards at this tine, as the market for PC cards spreads, mass production of PC cards can reduce their prices so that they are equal to or lower than those of adaptor cards.

Recently, the protection (security) or secret information on PC cards, which was conventionally made light of, is being focused on as a result of the expansion of the PC card market.

A locking mechanism for inhibiting the unauthorized removal of a PC card is disclosed in the specification for Japanese Patent Application No. Hei 05-182972 (Japanese Unexamined Patent Publication No. Hei 07-44269: Our company reference No. JA9-93-030), which is assigned to the present applicant. More specifically, according to the PC card locking mechanism in that specification, in a notebook PC that has a PC card slot in its side face and in which a keyboard is freely opened and closed, an engagement piece for preventing the removal of a PC card can be inserted while the keyboard is open, and the keyboard is then closed and locked, so that the removal of a PC card can be physically inhibited regardless of the manipulation of keys (see FIG. 8). The PIC card locking mechanism that interlinks with the locking of the keyboard is already employed for the ThinkPads 750 and 755 that are sold by IBM Japan, Ltd. ("ThinkPad" is a trademark of IBM Corp.)

Currently, however, not only physical (or hardware) security to prevent the theft of PC cards, but also software security to prevent the illegal copying of data and to prevent damage to data due to improper use must be considered.

According to the "PC Card Standard" in 1995, which the PCMCIA/JEIDA newly established, the capability of the internal bus for the PC card, called "Card bus", is strengthened beyond the conventional ISA (Industry Standard Architecture). The bus width is increased from 16-bit to 32-bit. The operating clock speed for the bus is changed to high, 33 MHz. The momentary maximum transfer speed reaches 132 Mbps, which corresponds to the performance of a PCI (Peripheral Component Interconnect) bus. It can be anticipated that, associated with this, PC cards with higher performances, such as CPU cards, speed memory cards, and multi media cards that can handle graphics and animated pictures, will be developed. Especially, CPU card can also serve as a "bus master" that can acquire the right to control the system bus in the PC. Compared with before, it is now extremely easier for hackers to invade a computer system by using such PC cards and to create tools for stealing data. The security of a PC card slot at the software level becomes more important in the point of view of the protection of the assets of a system.

OBJECTIVES

It is therefore one object of the present invention to provide an excellent information processing apparatus into which can be installed an expansion device (e.g., a PC card), and to a control method therefor.

It is another object of the present invention to provide an information processing apparatus that can protect secret information when an expansion device is installed, and to a control method therefor.

It is an additional object of the present invention to provide an information processing apparatus that can protect secret information at the software level when an expansion device is installed, and to a control method therefor.

It is a further object of the present invention to provide an information processing apparatus that can appropriately prevent the illegal invasion (i.e., access to secret information) of the information processing apparatus by means of an installed PC card, and a control method therefor.

It is a still another object of the present invention to provide an information processing apparatus that can protect secret information at the software level by preventing the information processing apparatus from being accessed by means of an installed PC card, and to a control method therefor.

SUMMARY OF THE INVENTION

6. Summary of the Present Invention To achieve the above objects, according to a first aspect of the present invention, provided is an information processing apparatus, which includes a connecting section for installing a device and which supplies power to the installed device, wherein a supply of power to the device is halted during a predetermined operating mode.

According to a second aspect of the present invention, provided is an information processing apparatus, which includes a connecting section for installing a device and which supplies power to the device upon the detection of an installation of the device into the connecting section, wherein a supply of power from the connecting section is halted during a predetermined operating mode, regardless of whether or not the device is installed.

According to a third aspect of the present invention, provided an information processing apparatus, which includes a connecting section for installing a device and a detection section for detecting whether or not the device is installed into the connecting section, and which supplies power to the device in consonance with a detection result of the detec-tion section, wherein a supply of power to the installed device is halted during a predetermined operating mode by falsely determining that the device is not installed, regardless of the detection result of the detection section.

According to a fourth aspect of the present invention, provided is an information processing apparatus, which includes a connecting section for installing a device and which perform communication with the installed device, wherein the communication with the device is inhibited in a predetermined operating mode.

According to a fifth aspect of the present invention, provided is an information processing apparatus, which includes a connecting section for installing a device and which performs communication with the device upon the detection of an installation of the device into the connecting section, wherein the communication with the device is inhibited during a predetermined operating mode, regardless of whether or not the device is installed.

According to a sixth aspect of the present invention, provided is an information processing apparatus, which includes a connecting section for installing a device and a detecting section for detecting whether or not the device is installed into the connecting section, and which performs communication with the device in consonance with a detection result of the detection section, wherein the communication with the installed device is inhibited during a predetermined operating mode by falsely determining that the device is not installed, regardless of the detection result of the detection section.

According to a seventh aspect of the present invention, provided is a control method, for an information processing apparatus that includes a connecting section for installing a device and a detecting section for detecting whether or not the device is installed into the connecting section, by which it is determined that the device is not installed in the connecting section during a predetermined operating mode, regardless of the detection result of the detection section.

According to an eighth aspect of the present invention, provided is a control method, for an information processing apparatus that includes a connecting section for installing a device and a detecting section for detecting whether or not the device is installed into the connecting section, by which a supply of power to the installed device halted during a predetermined operating mode by determining that the device is not installed in the connecting section, regardless of the detection result of the detection section.

According to a ninth aspect of the present invention, provided is a control method, for an information processing apparatus that includes a connecting section for installing a device and a detecting section for detecting whether or not the device is installed in the connecting section, by which, during a predetermined operating mode, communication with the installed device is inhibited by determining that the device is not installed in the connecting section, regardless of the detection result of the detection section.

According to an information processing apparatus and a control method therefor, when an operating mode enters a "predetermined operating mode", the information processing apparatus performs a pseudo operation as though a device were not installed therein, regardless of whether the device is actually installed. In the predetermined operating mode, therefore, power is not supplied to the installed device, so that it does not become active. During this mode, the information processing apparatus can not exchange data with the installed device. That is, illegal invasion (i.e., access to secret data) from an installed PC card of an information processing apparatus can be appropriately prevented. Such an operation for protecting secret information by preventing the information processing apparatus from being accessed by means of the PC card can be realized by a software program.

The "predetermined operational mode" in this case defines a "security mode" during which a high level of security is provided for secret information.

When the information processing apparatus enters security mode, the input of a password may be requested of a user (or an operator). When the information processing apparatus resumes from the security mode, the input of a password may also be requested of the user (or the operator). Not only the retry of the input of a password but also the release of the security mode may be inhibited when a user fails to input the correct password within a predetermined number of attempts (e.g., three times). An unauthorized user is completely inhibited from releasing the security mode without permission and from illegally accessing secret data in the information processing apparatus by means of an installed device. The security mode according to the present invention can be provided by the information processing apparatus falsely recognizing that a device is not installed therein, regardless of whether the device is actually installed. The setup and release of the security mode is naturally controlled by the information processing apparatus, not by the installed device (e.g., the PC card), so that the mode can not be released as desired by means of the installed device. Therefore, even if an unauthorized user replaces the device without permission, that user can not invade the information processing apparatus.

Other objects, features and advantages of the present invention will become readily apparent during the following detailed explanation for an embodiment that is given while referring to the accompanying drawings.

BRIEF DESCRIPTION OF THE DRAWING

FIG. 7 is a diagram illustrating the state where an expansion device is installed in a personal computer, with FIG. 7(a) more specifically showing the state when an expansion adaptor is to be installed in a desktop PC, and with FIG. 7(b) more specifically showing the state where a PC card is to be installed in a notebook PC.

DESCRIPTION OF THE PREFERRED EMBODIMENT

Figure 1:
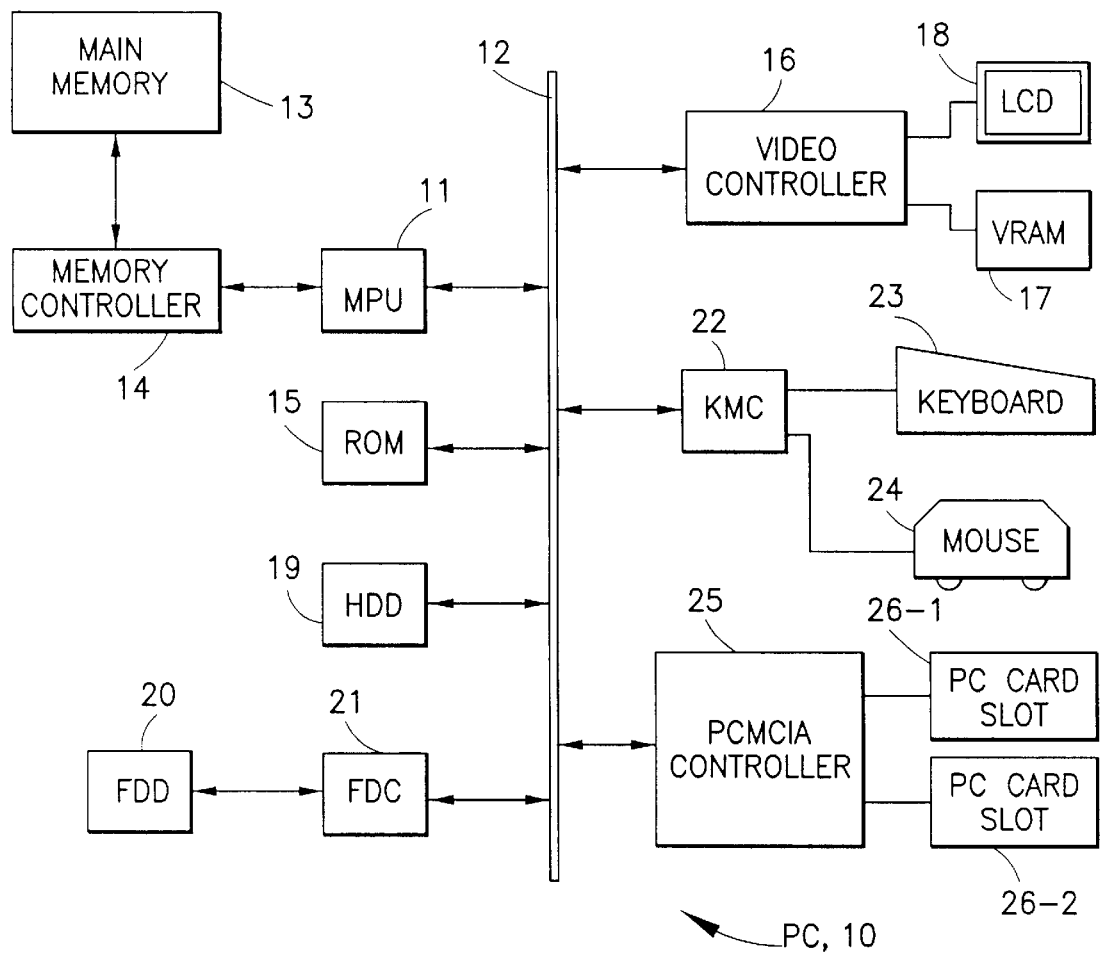
FIG. 1 is a diagram illustrating the hardware arrangement of a personal computer (PC) according to one embodiment of the present invention.

One embodiment of the present invention will now he described while referring to the drawings.

A. hardware arrangement of personal computer (PC) FIG. 1 is a diagram illustrating the hardware arrangement of a personal computer (PC) 10 according to one embodiment of the present invention.

In the PC 10, a micro processing unit (MPU) 11 that serves as a main controller executes various application programs under the control of an operating system (OS). The MPU 11 communicates with the individual sections across a common signal transfer path (also called a "bus") 12 that comprises data signal lines, address signal lines, and control signal lines.

A main memory 13 is a volatile memory (RAM) that is employed to load software, such as an OS and application programs, and that serves as a work area for the MPU 11. Dynamic RAM (DRAM), of which a relatively large memory capacity can be acquired at a low price, can be used as the main memory 13. A memory controller 14 controls the access to the main memory 13. A ROM 15 is a nonvolatile memory for which written data are determined during the manufacturing process, and is employed to semi-permanently store a coded test program that is to be performed at the time of powering on the system (POST), and programs for controlling hardware components in the system (BIOS).

A video controller 16, which is a peripheral controller for actually handling a drawing command from the MPU 11, first writes the processed drawing data into a screen buffer (VRAM) 17, and then reads the drawing data from the VRAM 17 and outputs the data to a display device (e.g., a liquid crystal display device (LCD)) 18.

A hard disk drive (HDD) 19 and a floppy disk drive (FDD) 20 are so-called auxiliary storage devices that are employed for storing software, and data that are created. A floppy disk controller (FDC) 21 is a dedicated controller for driving the FDD 20.

A keyboard/mouse controller (KMC) 22 is a peripheral controller for processing a matrix that is inputted at a keyboard 23 and coordinates that are pointed at by a mouse 24.

A PCMCIA controller (also called a "PCIC") 25 is a controller chip that enables the PC 10 (hereafter referred( to as a "host") and the PC card to exchange signals with each other. The PCMCIA controller 25 controls, at a low level (i.e., electrically or physically), the register and the I/O space of the PC cards installed into the host. PC card slots 26 for loading PC cards are provided on the local side of the PCMCIA controller 25. The PC card slots 26 may be one into which two PC cards of Type I/II, or a single PC card of Type III can be installed.

In addition to the components in FIG. 1, the PC 10 includes many other electric circuits and peripheral devices, as is well known to one having ordinary skill in the art. Since they do not need to be included in an explanation of the subject of the present invention, no explanation for them will be given in this specification.

Figure 2:
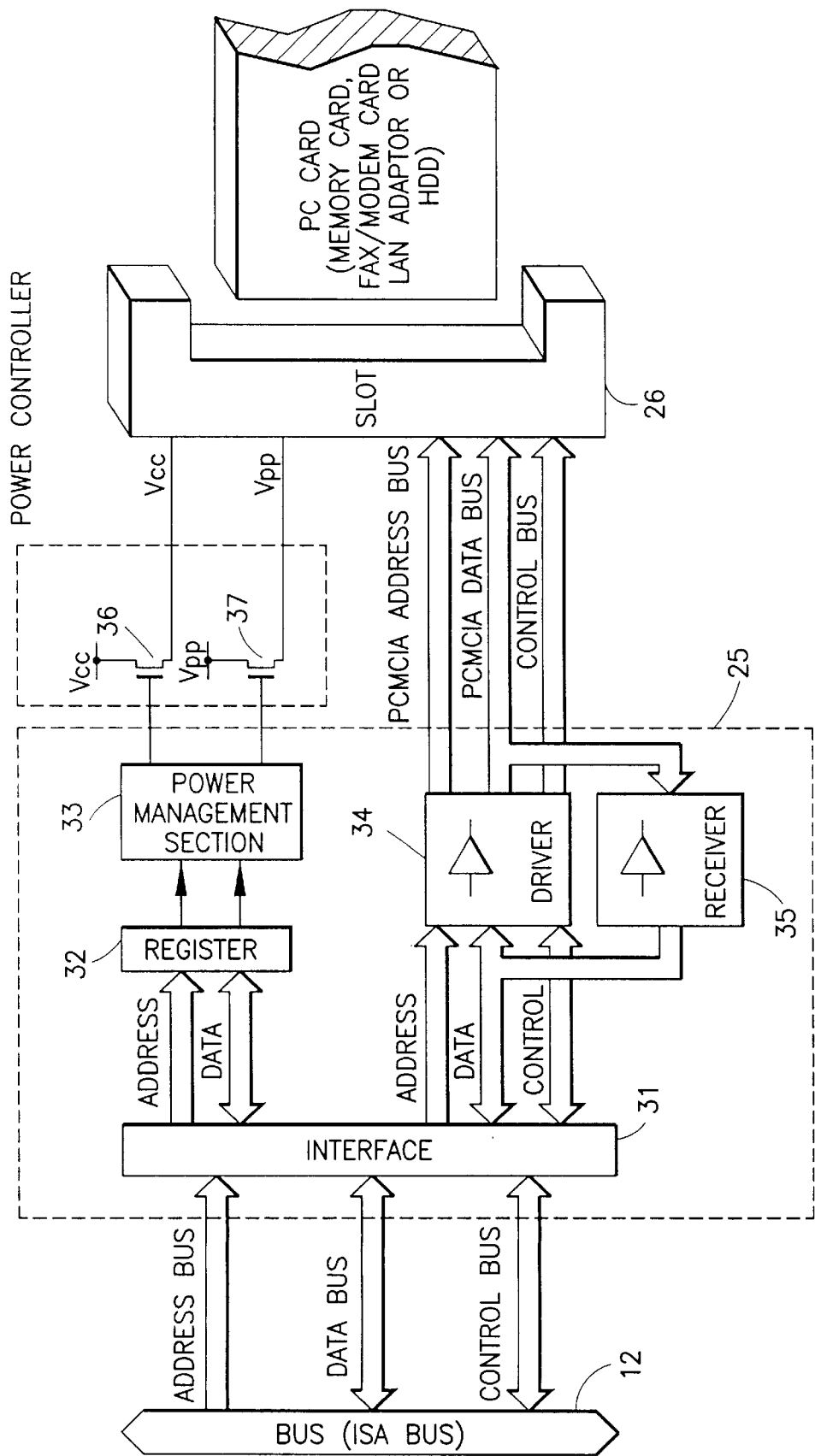
FIG. 2 is a detailed diagram illustrating the hardware arrangement with which a PC 10 communicates with a PC card.

B. Communication of personal computer (PC) with PC card FIG. 2 is a detailed diagram illustrating the hardware arrangement with which the PC 10 communicates with a PC card. The PC card is mechanically loaded into the PC card slot 26, and communicates electrically with a host-side bus 12 via the PCMCIA controller 25. The bus 12 can be, for example, an ISA (Industry Standard Architecture) bus.

The PCMCIA controller 25, which is a controller chip that enables the host and the PC card to exchange signals with each other, communicates with the host-side bus 12 via an interface 31, and communicates with the PC card via a driver 34 and a receiver 35.

The interface 31 is coupled by an address bus, a data bus and a control bus with the bus 12 (the address bus is unidi-rectional, while the data bus and the control bus are bidirectional), so that the access timing and the conversion of a data format between the host and the PC card can be handled.

The driver 34 is a circuit for driving a PC card in consonance with the contents of the control data that are transmitted across the control bus. The receiver 35 is a circuit that receives return data from the PC card and transmits the data to the interface 31.

Figure 3:
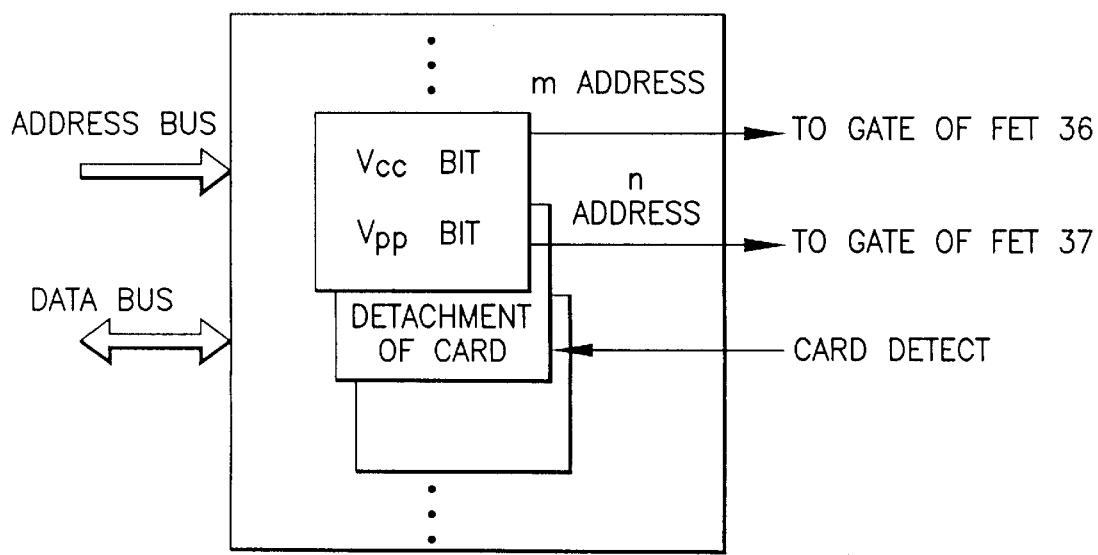
FIG. 3 is a specific diagram illustrating the internal arrangement of a register 32.

The register 32, which is a circuit for temporarily storing specific data, receives a part of the signals that are transmitted across the address bus and the data bus from the interface 31. The register 32 includes an address for writing a designated value concerning the system configuration (e.g., an I/O address, an IRQ level or a DMA level) sent by the host; an address for writing the installation/removal condition of the PC card slot 26; and an address for writing instructions concerning the power supply for the PC card slot 26 (i.e. a Vcc bit and a Vpp bit). FIG. 3 is a specific diagram illustrating the internal arrangement of the register 32. In FIG. 3, address in is assigned for the Vcc bit and the Vpp bit to control the respective power source, and address n is assigned for writing the installation/removal of the card. Whether the PC card is loaded to or unloaded from the card slot 26 can he detected by reading a voltage level at a specific connector pin (temporarily called a "(Card Detect" pin) of a PC card slot (well known). The result of the detection is written at address n in the register 32. When the host accesses the addresses in the register 32 by means of I/O read cycle or polling, the host can detect the installation of the PC card and can instruct the supply of power to the card slot 26.

According to the standard specifications that are prescribed by the PCMCIA/JEIDA, PC will supply two types of power voltages Vcc and Vpp to a PC card. The voltage Vcc is employed to provide basic voltage (3.3 V or 5 V) for the PC card to perform normal operations, and the voltage Vpp is employed to support the upgrade operation (e.g., data erasing/writing for flash memory) that require a relatively high voltage (12 V). In this embodiment, the power management section 33 in the PCMCIA controller 25 controls the supply and the halting of the power voltages Vcc and Vpp. More specifically, the power management section 33 transnits a control signal to the gates of FET switches 36 and 37 that are employed to supply, and to halt the supply of, the voltages Vcc and Vpp to the card slot 26. The power management section 33 refers to the Vcc bit and the Vpp bit of the register 32 and renders on or off the FET switches 36 and 37 in consonance With the contents of these bits, The FET switches 36 and 37 may be either P channel or N channel MOS FETs, and may be bipolar transistors.

Figure 4:
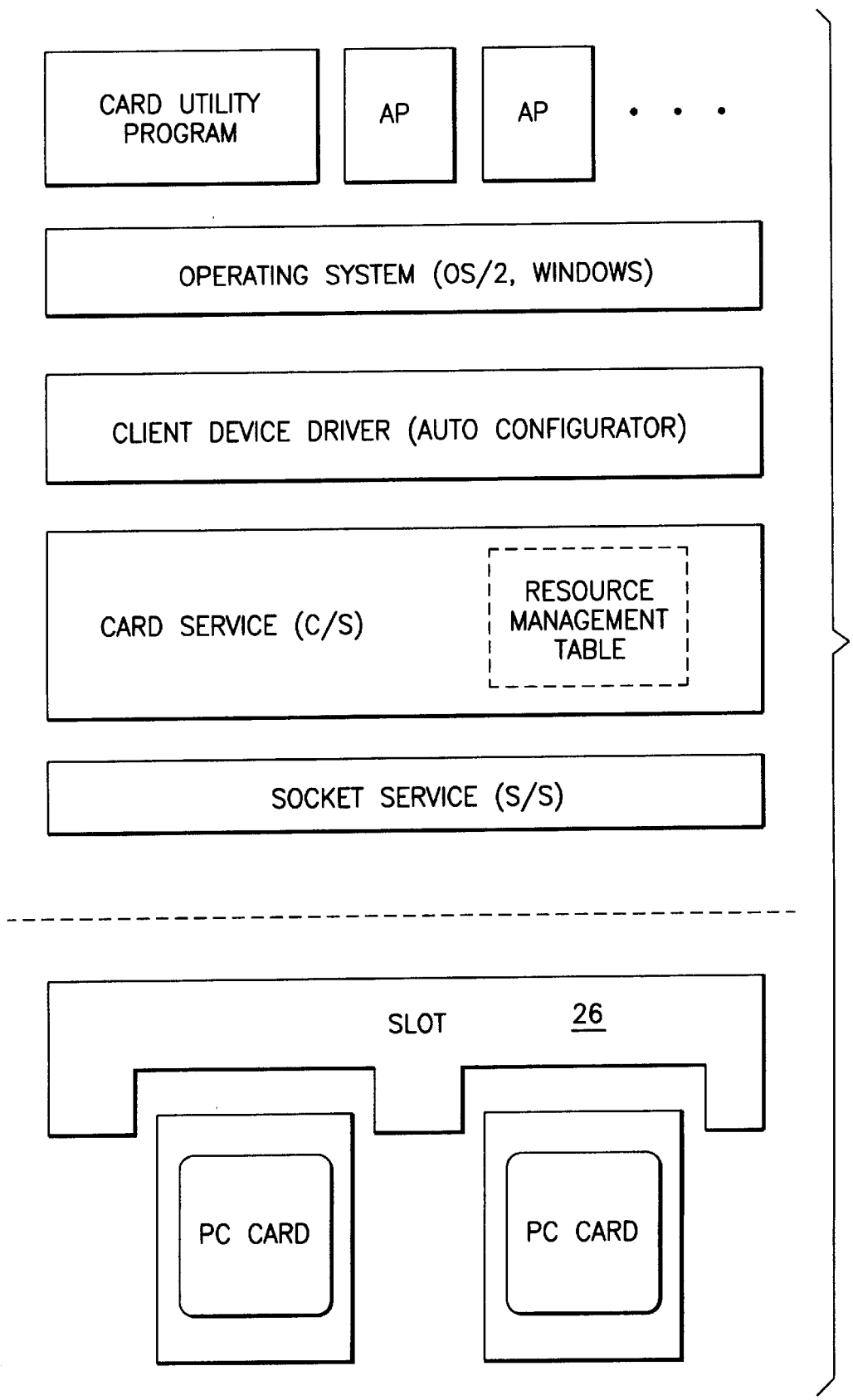
FIG. 4 is a diagram illustrating the software arrangement for the PC 10.

C. Software arrangement of personal computer (PC) FIG. 4 is a diagram showing the software arrangement of the PC 10 that implements the present invention. The programs that are loaded from the HDD 19 and the FDD 20 to the main memory 13 can be understood by a specific hierarchical system, as is shown in FIG. 4.

The lowest software layer are socket services (S/S). The socket services are interfaces that have function calls that directly access the PCMCIA controller 25. The specification for PCMCIA controller differs, in detail, from each other according to makers. For example, they differs in controlling the access operation and the plug & play operation. The socket services also can absorb such hardware differences. The socket services access data at a specific address in the register 32 of the PCMCIA controller 25 by employing I/O cycle, and read the data and write data in the register 32. The software, such as card services (C/S) (which will be described later), in the upper layer can acquire the state of the card slot 26 via the socket services.

The card services arc device drivers for managing the system resource assigned to the installed PC card, and arc positioned immediately above the socket services. The card services issue function call to the socket services, and provides programming interface for softwares in the upper layer (e.g., a "client device driver", which will be described later). The card services ordinarily have the following functions: (1) registration of card service client (2) report of a status, such as the insertion or the removal of a PC card (3) central control for hardware resource (e.g., memory space, I/O space, and interrupt level) assigned to the PC card installed to the slot 26.

The card services internally have a resource management table to manage the hardware resource. The card service according to this embodiment also has a function that realizes the present invention by the cooperation with a card utility program (which will be described later). This will be explained in the division D.

The client device driver enables an application program (to be described later) to use a PC card. "Auto configurator" from IBM Japan Ltd., for example, corresponds to this driver. The client device driver is basically a client program that can operate by using the card services. When the client device driver receives, from the card services, an event indicating that a PC card is inserted into the card slot 26, it refers to card attribute information (also called "CIS" or "tuple") that is recorded in the PC card, and automatically assigns the I/O space and the interrupt level (i.e., the system resource) to the PC card. After assigning the resources to the PC card, the client device driver also issues a request for the powering the power slot 26 to the card services. Sequentially, in response to a function call from the card service, the socket service accesses a predetermined address in the register 32 of the PCMCIA controller 25 to begin the supply of power of Vcc and Vpp. When the PC card is removed from the slot 26, the client device driver releases all the resources (the interrupt level, I/O space, and a socket) that were assigned to the installed PC card. As the resources are released, the supply of power to the slot 26 is accordingly halted.

An operating system (OS) is basic software for controlling the execution of application programs which arc located on the uppermost layer. The operating system provides several management functions, such as file management, memory management, task management and input/output management, and a user interface (a system command and a system call) for screen display and manipulation of a mouse. OS/2 and AIX (trademarks of IBM Corp.) and Windows (a trademark of Microsoft Corp.) correspond to such a operating system.

Application programs (APs) in the uppermost layer are loaded as needed into the main memory 13 from an auxiliary storage device, such as the HDD 19 or the FDD 20, as a user desires. A card utility program that is employed in this embodiment of the present invention is one of the application programs.

In the PC 10 that has the software layers shown in FIG. 4, upon a request from the client device driver, the card service registers an entry point (a common address for transmitting an event record to the client), which is called a call-back routine for the client. After registered, the PC card that is loaded into the slot 26 is integrated in the system configuration of the host and can be accessed by the host, D. Setup and release of security node The hardware and software arrangements of the computer system that embodies the present invention have been already described. In this division, the operation of the system and the processing of the present invention will be explained.

The personal computer 10 according to the present invention has a security mode in which communication of the host with an installed PC card is inhibited. This mode can be realized by the cooperative processing of the card service and the card utility program. The setup and release of the security mode will be explained according to subdivisions.

Figure 5:
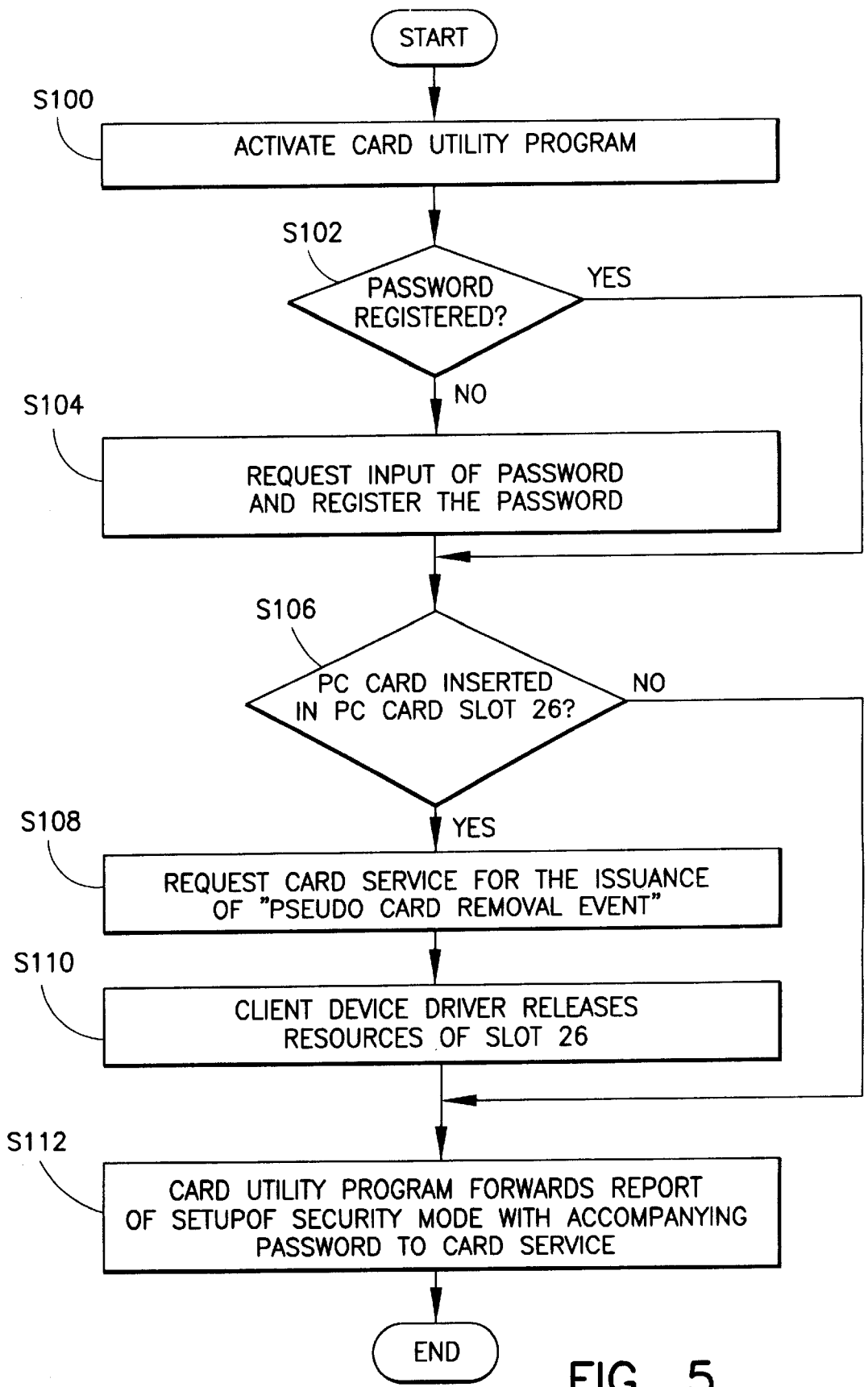
FIG. 5 is a flowchart showing the operation of the PC 10 for the setting of a security mode.

D-1. Setup of security mode FIG. 5 is a flowchart of the operation of the PC 10 for setting a security mode.

To set the security mode for the card slot 26, first, a user activates the card utility program (step S100). For the activation of the card utility program, a utility icon may be opened on a multi-window screen.

The activated card utility program queries a user to determine whether or not the user has registered his password (step S102). When a password has been already registered, program control skips step S104 and moves to step S106. When a password has not been registered, program control moves to step S104, at which the user is requested to input a password, and the password is registered.

At step S106, the card utility program determines whether or not a PC card is inserted into the card slot 26. IS the obtained decision is affirmative, program control advances to step S108. If the decision is negative, program control skips steps S108 and S110 and goes to step S112.

At step S108, the card utility program sends a request to the card service for the issuance of a "pseudo card removal event". Upon the occurrence of the pseudo card removal event, although the PC card remains in the slot 26, the host performs as though the removal of the PC card from the slot 26 had been detected. Physically, the bit at address n in the register 32 is reset, and the reset state is maintained, regardless of the detected level of the Card Detect pin of the card slot 26.

When the client device driver receives notification of the pseudo card removal event, the driver assumes that the PC card has been removed and releases the resources assigned to the slot 26 (step S110). As a result, the power supply to the slot 26 is halted.

At step S112, the card utility program reports to the card services the setup of the security mode together with a password. The card slot 26 then enters the security mode. The card services hold the received password independently, and thereafter will not accept a request for the release Of the security mode if the password does not accompany the request (which will be described later).

When a PC card is again loaded into the card slot 26 during the security mode, the card services ignore it and do not issue the client device driver an card insertion event. Further, even when the card services receive from the client device driver a request to begin the power supply to the slot 26, or another service request, the card services responds by simply signaling that "no PC card is loaded", and provide no service.

In this embodiment, the reason a password is submitted at the time the security mode is set is to prevent an unauthorized user from releasing the security mode without permission. It is possible for an unauthorized user who knows the function codes for card services to create and load a program that is similar to the card utility program and to induce the card services to perform a desired action (e.g., an issuance of an event signaling that a PC card is loaded). In this embodiment, however, access to the card service will not be permitted if the same password as the one registered by the card utility program does not accompany a request for access. Therefore, if an unauthorized user who does not know the correct password tries to Access the card service by using another program, the card services will not permit access.

Figure 6:
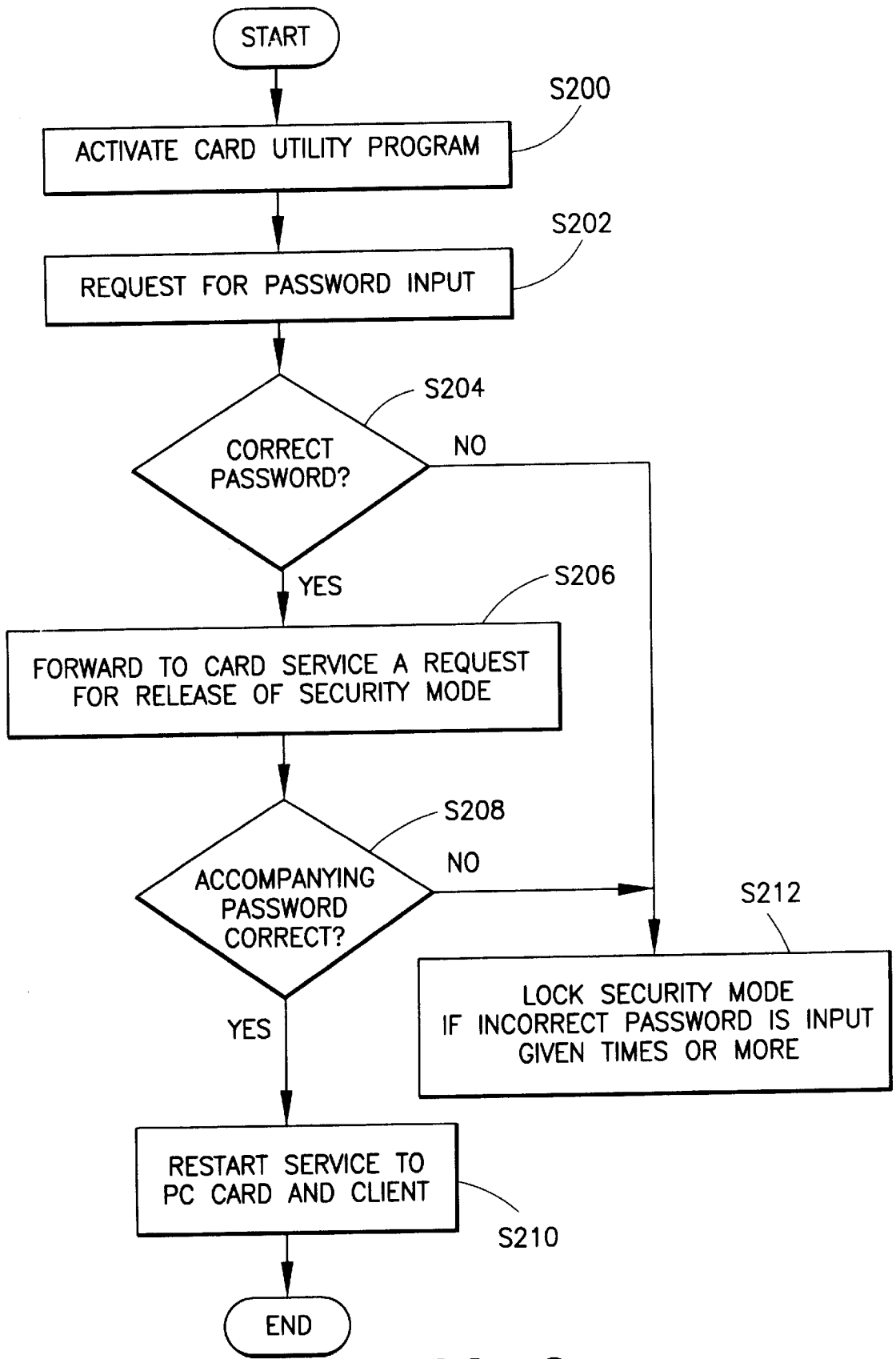
FIG. 6 is a flowchart showing the operation of the PC 10 for the release of the security mode.
Figure 8:
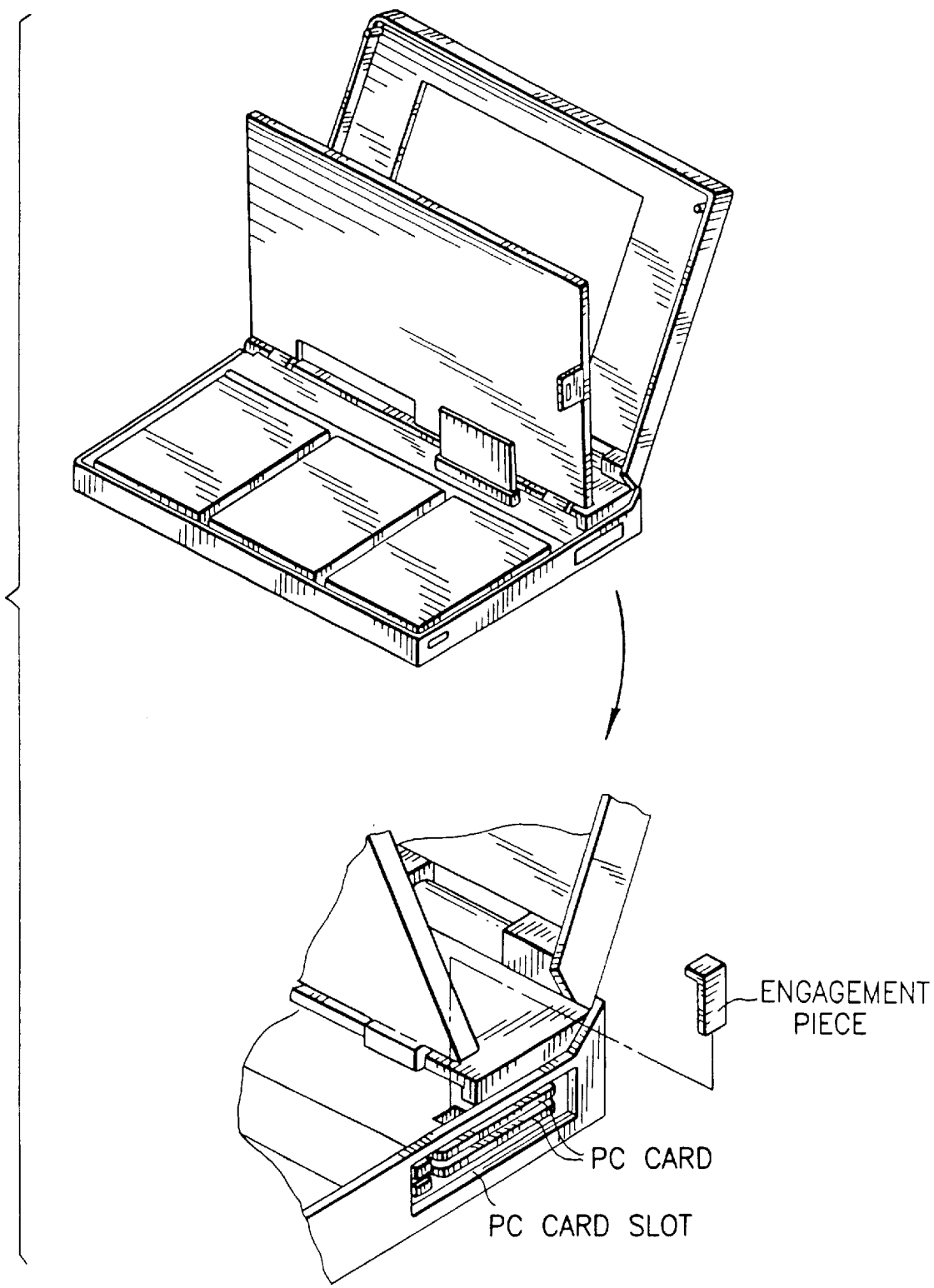
FIG. 8 is a diagram illustrating a conventional locking mechanism for a PC card.

D-2. Release of security mode FIG. 6 is a flowchart of the operation of the PC 10 for releasing the security mode.

To release the security mode for the card slot 26, first, a user activates the card utility program (step S200). I or the activation of the card utility program, a utility icon may be opened on a multi-window screen.

The activated card utility program requests a user to input his password (step S202). Then, the card utility program compares the entered password with the registered password and determines whether they match (step S204). When the input of the password fails, program control branches to No and goes to step S212, (which will be described later). When the input of the password succeeds, program control branches to Yes and advances to step S206.

At step S206, the card utility program submits to the card services for a request for the release of the security mode that is accompanied by the password that is entered at step S202.

At step S208, the card services compare the password that accompanies the request for the release or the security mode with the password that the card services hold. When the comparison is unsuccessful, program control branches to No and goes to step S212, (which will be described later). When the comparison is successful, program control branches to Yes and advances to step S210. The double examination of the password by the card utility program (step S204) and by the card services (step S208) is performed to prevent an unauthorized user from employing a program that is similar to the card utility program to release the security mode without permission, and to improve the security for secret information in the system.

At step S210, the card services restart the service to the loaded PC card and to the client device driver. As a result, the card services issue to the client device driver an event that the PC card is loaded into the card slot 26. The client device driver issues a command to start the power supply to the PC card and assigns the system resources to the PC card.

At step 212, to which program control moves when the input of the password is unsuccessful, the card utility program or the card services affords a user several opportunities (e.g., two changes) to re-enter the password. When the input of the password is successful, program control recovers to the normal procedure (step S206 or S210). When, it step S212, the input of the password is unsuccessful, not only is the further input of a password is inhibited, but also the security mode is locked and the release of the mode is disabled. When the security mode is locked, the PC card can not accessed unless the PC 10 is powered on again (Power On Reset). Since the volatile data in the PC 10 is naturally lost when the power is switched off and on, the illegal access of secret data can be prevented.

E. Appendix The present invention has been described in detail while referring to the specific embodiment. However, it should be obvious to one having ordinary skill in the art that various modifications or revisions of the embodiment are possible within the scope of the present invention. That is, although the present invention has been disclosed by using an example, it should not be limited to that example. To understand the subject of the present invention, the claims should be referred to.

As is described above in detail, according to the present invention, when an operating mode enters a "security mode", the information processing apparatus performs a pseudo operation as though a device (a PC card) were not installed therein, regardless of whether the device is still actually installed. During the security mode, therefore, power is not supplied to the installed PC card so that it does not become active. During this mode, the personal computer can not exchange data with the installed PC card.

When the security mode is to be set, the input of a password may be requested of a user. When the security mode is to be released, the input of a password may also be requested of the user. Further, not only the retry of the input of a password but also the release of the security mode may be inhibited when a user fails to input the correct password within a predetermined number of attempts.

According to the present invention, an unauthorized user is completely inhibited from releasing the security mode without permission and from illegally accessing secret data in the PC by means of a PC card. Although a PC card, such as a CPU card that can serve as a bus master, is developed according to the 1995 "PC card standard" established by PCMCIA, even if an unauthorized user inserts such PC card into the PC card slot of a PC, the illegal leak of secret data can be prevented in the security mode.

Further, according to the present invention, the security mode can be provided by the information processing apparatus falsely recognizing that a device is not installed therein, and the mode can not be released by means of the installed device. Therefore, even if an unauthorized user replaces the device without permission, that user can not invade the PC.

That is, according to the present invention, illegal invasion (i.e., access to secret data) from an installed PC card of an information processing apparatus can be appropriately prevented. Such an operation for protecting secret information can be realized by a software level.

Having thus described our invention, what we claim as new and desire to secure by Letters Patents is:

1. An information processing apparatus having a slot for receiving a removable expansion device, the information processing apparatus having a security operating mode in which the information processing apparatus may be used by a user while the expansion device is selectively disabled, comprising:

a controller for interfacing between the information processing apparatus and the expansion device, the controller supplying power to said expansion device, wherein the controller supplies no power to said expansion device during the security operating mode.

2. An information processing apparatus as recited in claim 1, wherein said information processing apparatus enters said security operating mode when an input password matches a stored password.

3. An information processing apparatus according to claim 2, wherein said security operating mode is maintained until power to the information processing apparatus is terminated if a user inputs an incorrect password a predetermined number of times.

4. An information processing apparatus as recited in claim 1, wherein said information processing apparatus terminates said security operating mode and enables said controller to supply power to said expansion device when an input password matches a stored password.

5. An information processing apparatus as recited in claim 4, wherein said input password is matched to the stored password at a software level that services the expansion device.

6. An information processing apparatus having a security operating mode in which the information processing apparatus may be used by an operator while an expansion device is selectively disabled, comprising:

a connecting section for installing the expansion device and for supplying power to said device upon the detection of an installation of said device into said connecting section, wherein a supply of power from said connecting section is halted during the security operating mode, regardless of whether or not said device is installed in said connecting section.

7. An information processing apparatus having a security operating mode in which the information processing apparatus may be used by an operator while an expansion device is selectively disabled, comprising:

a connecting section for installing the expansion device; and a detecting section for detecting whether or not said device is installed in said connecting section, wherein power is supplied to said device when said detecting section detects that said device is installed in said connecting section, and wherein the power supplied to said device is halted during the security operating mode by determining that said device is not installed regardless of whether or not said detecting section detects that said device is not installed in said connecting section.

8. An information processing apparatus having a security operating mode in which the information processing apparatus may be used by an operator while an expansion device is selectively disabled, comprising:

a connecting section for installing the expansion device and communicating with said device, wherein all communication with said device is inhibited during the security operating mode.

9. An information processing apparatus having a security operating mode in which the information processing apparatus may be used by an operator while an expansion device is selectively disabled, comprising:

a connecting section for installing the expansion device and communicating with said device upon the detection of an installation of said device into said connecting section, said communication with said device being inhibited during the security operating mode regardless of whether or not said device is actually installed.

10. An information processing apparatus having a security operating mode in which the information processing apparatus may be used by an operator while an expansion device is selectively disabled, comprising:

a connecting section for installing the expansion device; and a detecting section for detecting whether or not said device is installed into said connecting section and for enabling communicating with said device when said detecting section determines that said device is installed, wherein communication with said device that is installed is inhibited during the security operating mode by falsely determining that said device is not installed regardless of whether or not said detecting section determines that said device is actually not installed.

11. A control method for an information processing apparatus having a connecting section with a slot for receiving an expansion device, a detecting section for detecting whether or not said device is received in said slot, and a power controlling section responsive to said detecting section for halting a supply of power from said connecting section to said slot when said detecting section determines that said device is not received in said slot, said method comprising the step of:

selectively halting the supply of power to said device during a security operating mode by indicating to said power controlling section that said device is not received in said slot regardless of whether or not said detecting section determines that said device is received in said slot.

12. A control method for the information processing apparatus, as recited in claim 11, wherein said information processing apparatus enters said security operating mode when an input password from a user matches a stored password.

13. A control method for the information processing apparatus, as recited in claim 11, wherein said information processing apparatus resumes from said security operating mode when an input password from a user matches a stored password.

14. A control method for the information processing apparatus as recited in claim 11, wherein said input password is matched to the stored password at a software level that services the expansion device.

15. A method as recited in claim 14, wherein resuming from the security mode is inhibited until power to the information processing apparatus is terminated when a user inputs an incorrect password a predetermined number of times.

16. A control method for an information processing apparatus having a connecting section for installing an expansion device and a detecting section for detecting whether or not said device is installed, into said connecting section, and means responsive to said detecting section for inhibiting communication with said device when said detecting section determines that said device is not installed into said connecting section, said method comprising the step of:

selectively inhibiting communication with said device during a security operating mode by indicating to said inhibiting means that said device is not installed into said connecting section regardless of whether or not said detecting section determines that said device is installed into said connecting section.

17. An information processing apparatus having a security operating mode in which the information processing apparatus may be used by an operator while an expansion device is selectively disabled, comprising:

a connecting section for installing the expansion device and assigning system resource outside of said device for use by said device, wherein said system resource assigned to said device is released during the security operating mode.

18. An information processing apparatus having a security operating mode in which the information processing apparatus may be used by an operator while an expansion device is selectively disabled, comprising:

a connecting section for installing the expansion device and a detecting section which assigns a system resource to said device upon detection of an installation of said device into said connecting section, wherein said system resource assigned to said device is released during the security operating mode regardless of whether or not said device is installed.

19. An information processing apparatus having a security operating mode in which the information processing apparatus may be used by an operator while an expansion device is selectively disabled, comprising:

a connecting section for installing the expansion device; and a detecting section for detecting whether or not said device is installed in said connecting section and for assigning a system resource to said device when said detecting section detects that said device is installed in said connecting section, wherein said system resource assigned to said device is released during the security operating mode by falsely determining that said device is not installed regardless of whether or not said detecting section detects that said device is not installed.

20. A control method, for an information processing apparatus having a connecting section for installing a device and a detecting section for detecting whether or not said device is installed into said connecting section, said method comprising the step of:

releasing a system resource assigned to said device during a security operating mode by determining that said device is not installed into said connecting section regardless of whether or not said detecting section detects that said device is not installed in said connecting section.

* * * * *